(12) United States Patent
Atkinson et al.

(10) Patent No.: US 7,059,367 B2
(45) Date of Patent: *Jun. 13, 2006

(54) LIQUID LEVEL MAINTAINING DEVICE

(75) Inventors: Louis D. Atkinson, 12535 W. Wilbur Dr., New Berlin, WI (US) 53151; Shane T. Bloomer, Oak Creek, WI (US)

(73) Assignee: Louis D. Atkinson, New Berlin, WI (US)

( * ) Notice: Subject to any disclaimer, the term of this patent is extended or adjusted under 35 U.S.C. 154(b) by 34 days.

This patent is subject to a terminal disclaimer.

(21) Appl. No.: 11/047,896

(22) Filed: Feb. 1, 2005

(65) Prior Publication Data

US 2005/0211333 A1    Sep. 29, 2005

Related U.S. Application Data

(63) Continuation of application No. 10/807,763, filed on Mar. 24, 2004, now Pat. No. 6,848,483.

(51) Int. Cl.
B65B 1/04    (2006.01)

(52) U.S. Cl. .................. 141/198; 141/95; 137/393; 47/48.8

(58) Field of Classification Search .............. 141/67, 141/95, 198; 137/805, 393; 119/51.01, 119/51.05; 47/48.5
See application file for complete search history.

(56) References Cited

U.S. PATENT DOCUMENTS 2,737,201 A    3/1956 St. Clair et al.
3,267,949 A    8/1966 Adams
3,279,495 A    10/1966 Taylor (Continued)

OTHER PUBLICATIONS

The EarthBox—The Garden of the Future! (http://web.archive.org/web/ 2005012712045/https://www.earthbox.com/better.asp) Here's Why Your Plants Grow Better in the EarthBox; (https://www.earthbox.com/opening.asp) Welcome to the Revolutionary Ear Container Garden; (https://www.earthbox.com/grow.asp) The Earth Box Is So Simple . . . ; (https://www.earthbox.com/history.asp) Copyright © 2002 The EarthBox. Printed Jan. 27, 2005 and Jan. 28, 2005.

*Primary Examiner*—Steven O. Douglas
(74) *Attorney, Agent, or Firm*—Andrus, Sceales, Starke, & Sawall, LLP

(57) ABSTRACT

The present invention pertains to a plant watering system that is particularly suited for a plant container with a reservoir of water below the plant. The watering system uses a pilot controlled sequence valve to maintain the water level of the reservoir. The sequence valve includes a diaphragm that is pneumatically coupled to a pilot port fixed to the reservoir and submersed in the water. When the water level in the reservoir reaches a lower limit, the reduced pressure on a diaphragm causes it to open a pathway for water to flow from a water supply to the reservoir. When the water level reaches an upper limit, the increased pressure on the diaphragm causes it to close that pathway and shut off the water flow. The water supply can be an elevated tank or the pressurized water system. A pressure regulator can be used to lower the water pressure at the intake of the sequence valve. A nozzle controls the flow rate of water into the reservoir.

19 Claims, 7 Drawing Sheets

U.S. PATENT DOCUMENTS

| | | |
|---|---|---|
| 3,467,122 A | 9/1969 | Jones |
| 3,552,431 A | 1/1971 | Schmidlin |
| 3,581,754 A | 6/1971 | Adams |
| 3,603,214 A | 9/1971 | Murrell |
| 3,690,339 A | 9/1972 | McKinnon et al. |
| 3,742,967 A | 7/1973 | Barnard |
| 3,747,629 A | 7/1973 | Bauman |
| 3,759,294 A | 9/1973 | Kongelka |
| 3,774,628 A | 11/1973 | Norton et al. |
| 4,191,208 A | 3/1980 | Mylander |
| 4,527,593 A | 7/1985 | Campau |
| 4,603,709 A | 8/1986 | Huisma |
| 4,744,387 A | 5/1988 | Otteman |
| 5,113,888 A | 5/1992 | Beggs |
| 6,273,117 B1 | 8/2001 | McPhee |
| 6,363,959 B1 | 4/2002 | Ollivier |

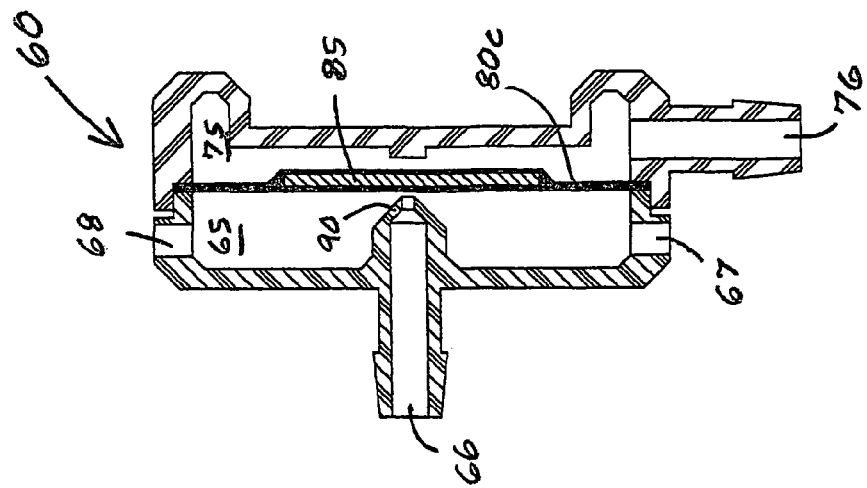
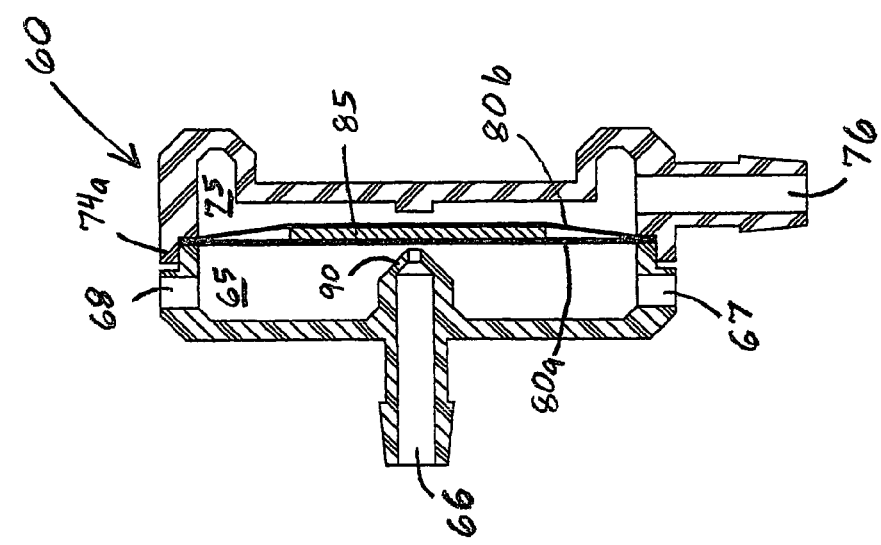
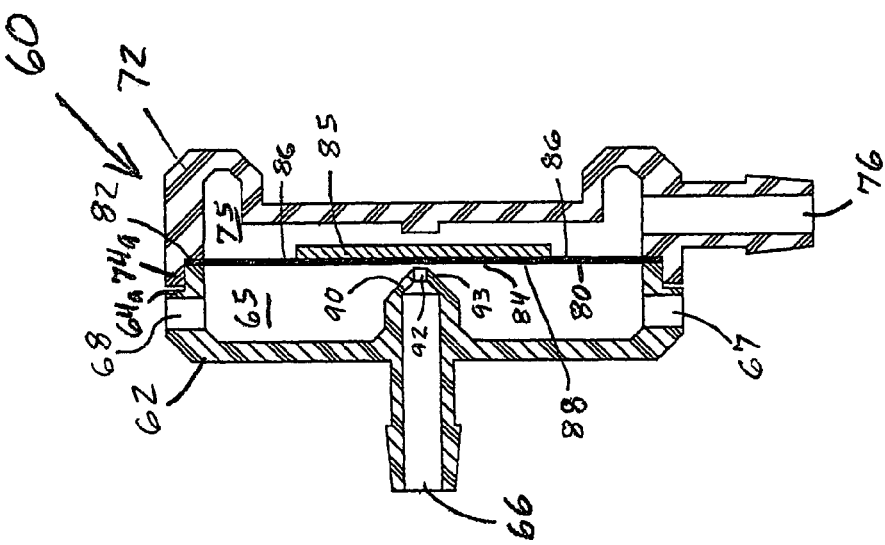

LIQUID LEVEL MAINTAINING DEVICE

RELATED APPLICATIONS

This application claims priority under 35 U.S.C. §120 of the U.S. patent application Ser. No. 10/807,763 filed on Mar. 24, 2004 now U.S. Pat. No. 6,848,483 and entitled "LIQUID LEVEL MAINTAINING DEVICE". The U.S. patent application Ser. No. 10/807,763 filed on Mar. 24, 2004, and entitled "LIQUID LEVEL MAINTAINING DEVICE" is also hereby incorporated by reference.

TECHNICAL FIELD OF THE INVENTION

The present invention relates to a liquid level maintaining device particularly suited to maintain a desired water level of a container such as a plant reservoir.

BACKGROUND OF THE INVENTION

Vessels for holding liquid come in a variety of shapes and sizes, and serve a variety of purposes, such as swimming pools, fuel tanks, water troughs, plant reservoirs, etc. These containers share a common problem. Maintaining the held liquid at a desired level or within a desired range is an arduous and never ending task. This problem is particularly troublesome when the water has to be manually and frequently carried to and poured into the container as is the case with potted plants.

Providing a proper water supply is fundamental to health and growth for all plants, and greatly affects the size, quality and yield of any fruit or vegetables they produce such as tomatoes, potatoes, beans, cucumbers, berries, and the like. Maintaining a proper water supply to a plant requires ongoing observation and watering, particularly for potted plants where the nutrients and water supply to the roots are confined to the soil in the pot. While most people enjoy the beauty of plants or the quality and taste of home grown vegetables, many find plant watering a monotonous or time consuming task. Even those that enjoy the satisfaction of caring for their plants are frequently unable to water them when they are away from home or if they simply forget. Routine plant watering is also somewhat complicated by the fact that water consumption rates vary for a variety of factors, such as the type or size of the plant, the type of soil and weather or sunlight conditions. Different plants consume water at different rates, and these rates vary during different seasons of the year and different days of the week. Maintaining a proper water level is particularly important for systems where the roots extends below the soil and into a lower water reservoir. The root system is exposed to air and can dry out or experience strain when the water in the reservoir drops below a desired level.

A variety of devices and systems have been developed to help monitor or supply a proper amount of water to conventionally potted or hydroponic potted plants. These devices and systems include: visual floats as in U.S. Pat. No. D257,529 to Rapp, U.S. Pat. No. 4,895,254 to Block, U.S. Pat. No. 5,644,868 to Lui and U.S. Pat. No. 6,279,265 to Scannell; overflow openings as in U.S. Pat. No. 4,467,561 to Tsuchiya; gravity fed systems with small apertures or holes to provide desired flow rates as in U.S. Pat. No. 5,806,240 to Racine and U.S. Pat. No. 6,598,338 to Buss; gravity fed systems with water level activated valves or the like as in U.S. Pat. No. 4,042,150 to Roos, U.S. Pat. No. 4,157,770 to Roos, U.S. Pat. No. 5,090,443 to Jacobsen and U.S. Pat. No. 6,216,386 to LaBahn; and electrically powered systems as in U.S. Pat. No. 5,337,515 to Robins and U.S. Pat. No. 5,557,884 to Deppe, the disclosures of which are incorporated by reference.

A problem with conventional plant watering systems that use a float to control the flow of water to the water reservoir is that the root system of the plant inhibits the movement of the float. Should the float become blocked in the deactivated position, the water supply to the plant will dry up. Should the float become blocked in the activated position, the water supply will overfill the potted plant, which could harm or kill the plant, waste water, and cause a costly spill onto the surrounding area, particularly if the system is inside a home or building. The root system of a healthy growing plant can be so pervasive that the movement of the float can be completely blocked. As a result, watering systems using float actuated valves are usually impractical for hydroponic systems.

Conventional watering systems that require electric power are typically too expensive for residential or personal office applications. The few plants being maintained by one or two people or even a large family simply does not warrant an elaborate and expensive watering system. These watering systems also need to be cleaned and maintained on a regular basis to ensure proper operation. Improper maintenance or setup can result in costly spills and harm the plant.

Another problem with conventional watering systems is that they require too great a change in water level in the reservoir to activate or deactivate water flow to the reservoir. The root systems of plants using these watering systems are constantly experiencing too much or too little water, which results in poor plant growth and health.

The present invention is intended to solve these and other problems.

BRIEF DESCRIPTION OF THE INVENTION

The present invention pertains to a liquid level maintaining device that is particularly suited as a watering system for a plant container with a water reservoir. The device uses a pilot controlled sequence valve to maintain the liquid level in the reservoir. The sequence valve includes a diaphragm that is pneumatically coupled to a pilot port fixed inside the reservoir and submersed in the liquid. When the liquid level in the reservoir reaches a lower limit, the reduced pressure on a diaphragm causes it to open a pathway for liquid to flow from a liquid source to the reservoir. When the liquid level reaches an upper limit, the increased pressure on the diaphragm causes it to close that pathway and shut off the flow of liquid. The liquid source can be an elevated tank or a pressurized system. A nozzle restricts the rate of liquid flow through the device. A regulator can be used to lower the liquid pressure at the intake of the sequence valve.

One advantage of the present liquid level maintaining device is its simplicity and reliability. The pilot port has an interior chamber filed with a gas such as air, and an open lower end. The pilot port is fixed at a predetermined height inside the water reservoir, so that its open end is submerged in the liquid or water. The air in its chamber directly senses the water pressure at this fixed height, which signifies the level of water in the reservoir. The air pressure in the chamber is communicated via a tube to the sequence valve and its elastic diaphragm to open and close the valve as dictated by the water level in the reservoir. No moving parts are located in the reservoir. The motionless or solid-state operation of the pilot port is not clogged, encumbered or otherwise restricted by the root system or dirty environment of the potted plant. A simple screen can be used to keep roots out of the pilot port. As a result, the device provides a reliable means for measuring the liquid level in a liquid container and maintaining it at a desired level or range of levels, so as to support the health and growth of a plant while minimizing or eliminating any risk of an inadvertent spill.

Another advantage of the present liquid level maintaining device is its versatility and ease of use. The watering system can be placed in a wide variety of locations, and can use alternate water sources. The pneumatically controlled watering system requires no electricity. The watering system can be placed just about anywhere inside or outside a house or building without considering electrical outlet locations or extension cord routings. There are also no controls to set or manuals to read to operate the system. The desired water level is easily set by fixing the pilot port at the desired height in the reservoir. When the liquid level maintaining device is provided with the reservoir, the pilot port can be secured by the manufacturer so that no set up is required. The system can also be connected to a refillable supply tank in a gravity fed application or the pressurized water system of a house or building. When connected to a pressurized water system, there are no heavy water tanks or jugs to periodically remove or refill. The supply of water to the reservoir is automatically turned on and off or otherwise controlled by the device.

A further advantage of the present liquid level maintaining device is its ability to maintain the water level of the reservoir at a relatively constant level. Wide variations in water level are not needed to activate or deactivate the pilot controlled sequence valve. The upper and lower water level limits of the system are relatively close. The pilot port only requires a fraction of an inch change in water level to move the elastic diaphragm in the sequence valve between open and closed positions. The device can maintain the water level in a container to within ¼ to ¾ of an inch of a desired level or height. The root system of the plant experiences a relatively constant water supply, and is not is unduly exposed to changes in water level that can strain or dry out portions of the root system due to prolonged exposure to the air.

A still further advantage of the present liquid level maintaining device is that the flow rate can be adjusted in one of two ways. The flow rate can be increased by increasing the pressure differential between the upper and lower limits of the reservoir. The flow rate can also be increased, without increasing this pressure differential, by simply increasing the size of some of the parts, such as the diameter of the diaphragm, nozzle or piping for the liquid.

A still further advantage of the present liquid level maintaining device is that additional liquid can be manually or otherwise added to the container, other than by use of the device, without harming the device or its operation. Although the container will be filled above the desired liquid level of the container when the device is bypassed, the device and its operation will not be adversely affected. The device will continue to operate when the liquid level again falls below the desired liquid level. The device does not need to be disconnected or reconnected when it is bypassed by adding liquid to the container another way.

Other aspects and advantages of the invention will become apparent upon making reference to the specification, claims and drawings.

BRIEF DESCRIPTION OF THE DRAWINGS

FIG. 3A is a side sectional view of the sequence valve with a stiffening disk.

FIG. 3B is a side sectional view of a second embodiment of the sequence valve with the stiffening disk sandwiched between two diaphragms.

FIG. 3C is a side sectional view of a third embodiment of the sequence valve with the stiffening disk molded into the diaphragm.

DESCRIPTION OF THE PREFERRED EMBODIMENTS

While this invention is susceptible of embodiment in many different forms, the drawings show and the specification describes in detail preferred embodiments of the invention. It should be understood that the drawings and specification are to be considered an exemplification of the principles of the invention. They are not intended to limit the broad aspects of the invention to the embodiments illustrated.

Figure 1:
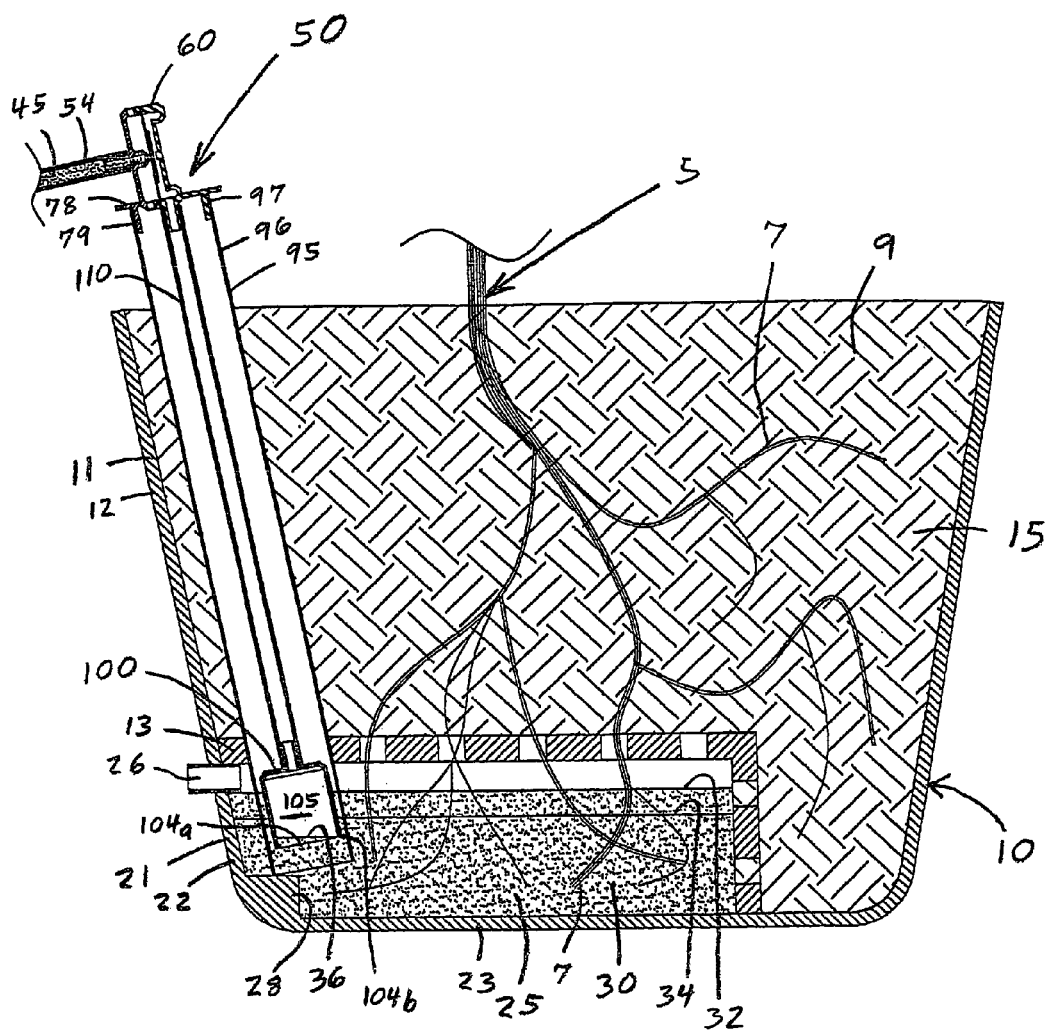
FIG. 1 is a cross sectional view of the inventive liquid level maintaining device showing its sequence valve and pilot secured to a feed tube extending into the reservoir of a plant container.

FIG. 1 shows a plant 5 with a root system formed by individual roots 7. The plant 5 is growing in soil 9 held by a container 10 with upper and lower portions 11 and 21. The upper portion 11 has a sidewall 12 and a floor 13 that define an upper compartment 15. This compartment 15 contains the soil 9 and root system of the plant 5. The lower portion 21 has a sidewall 22 and a floor 23 that define a lower compartment or reservoir 25. This reservoir 25 holds a body of water 30 having an actual surface level. The sidewalls 12 and 22 and floors 13 and 23 are robustly designed to support the weight of the plant 5, soil 9 and water 30, and are preferably an integrally molded plastic piece. The floor 13 of the upper compartment 11 is formed by molded plastic having several openings with a diameter of about ½ inch. The floor 13 supports the plant 5 and soil 9 and allows oxygen to enter the water 30 in the reservoir 25. Many roots 7 pass through the floor 13 and into the water 30. The lower portion 21 includes an overflow outlet 26 that prevents the water level from rising above a set height. The outlet 26 also acts as a vent to allow air to enter the space between the floor 13 and the actual surface level of the water 30. A raised ledge 28 is provided for reasons discussed below. The plant container 10 is preferably a modified container manufactured by Laminations, Inc., of Scranton, Pa., and sold under the EarthBox name and mark, and discussed in U.S. Pat. Nos. 5,103,584; 5,193,306; 5,379,547; 5,524,387 and 5,555,675.

As the level of the water 30 in the reservoir 25 drops below a desired or set level 32 to a lower level 34, a source of liquid water 40 is used to provide make-up water 45 to the reservoir. The water source 40 can be an elevated tank (not shown) holding additional water 45 or a faucet or spigot (not shown) of a standard pressurized water system of a house or building. Although the body of water 30 and make-up water 45 are stated to be water, it should be understood that the water can be oil, gasoline, a chemical solution, a water and nutrient or additive solution, or any of a wide variety of liquids without departing from the broad aspects of the invention. For example, the water 45 in the refillable or reusable tank can be a liquid water solution containing dissolved nutrients or additives for maintaining the health and growth of a plant. The water 30 in the reservoir can also be a liquid water solution containing nutrients or additives.

Figure 2A:
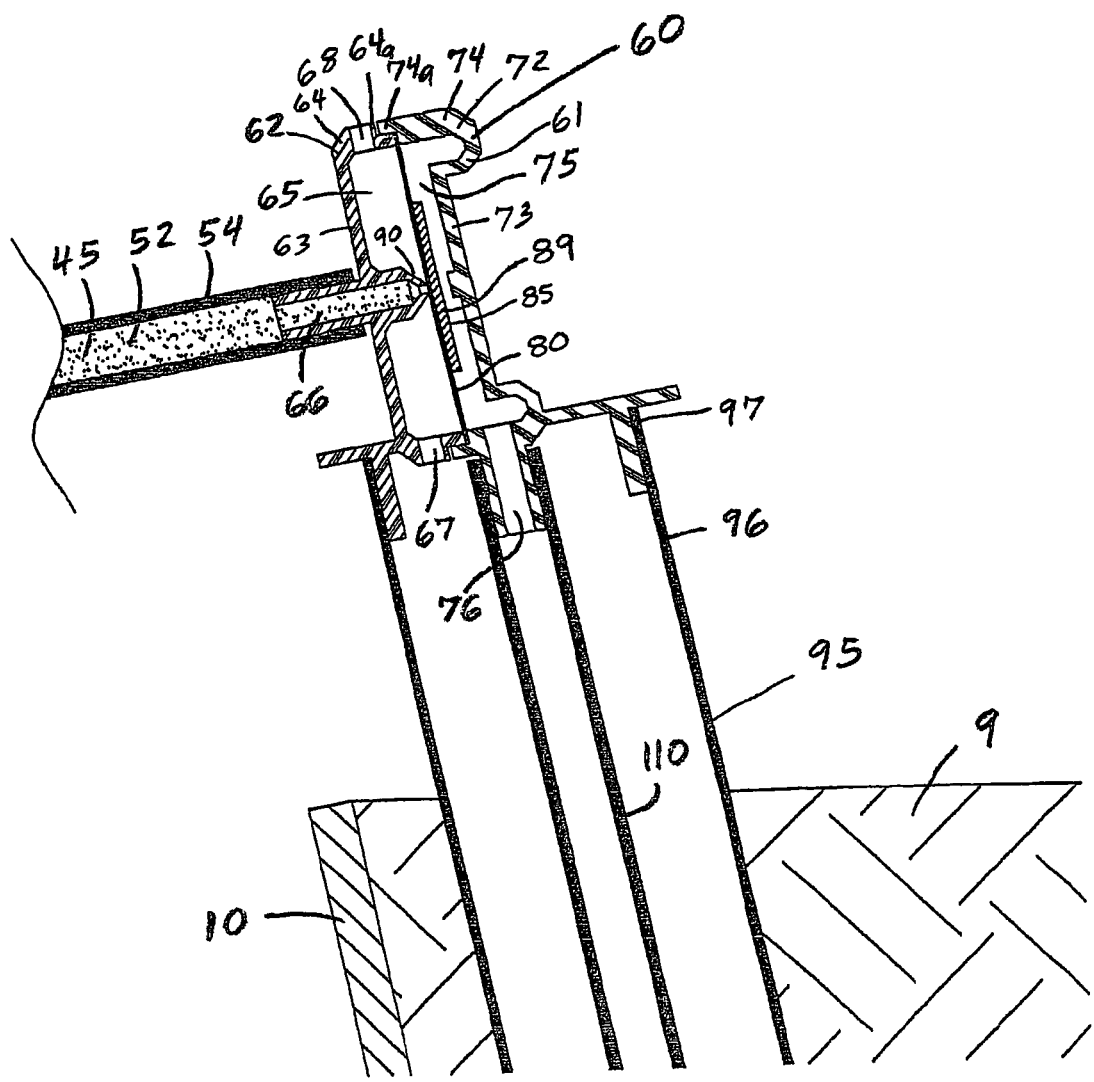
FIG. 2A is an enlarged cross sectional view of the sequence valve showing its ambient and control chambers separated by an elastic diaphragm shown in its closed position, and the relative locations of its inlet nozzle, air vent, outlet drain and access opening.
Figure 2B:
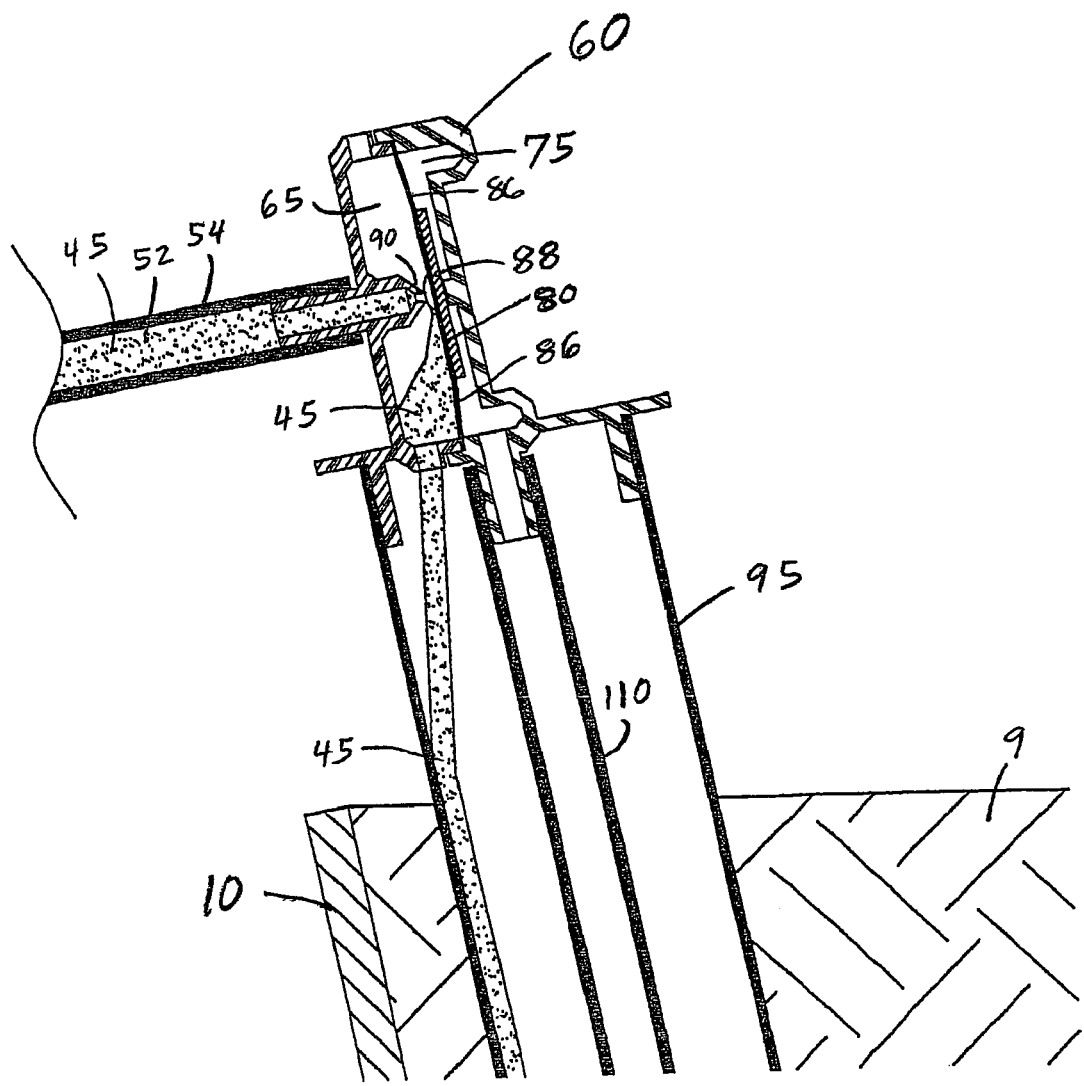
FIG. 2B is an enlarged cross sectional view of the sequence valve showing its ambient and control chambers separated by an elastic diaphragm shown in its open position with makeup water flowing through the device.

The present invention pertains to a liquid level maintaining device or apparatus generally indicated by reference number 50 and shown in FIGS. 1 and 2A and 2B. The elevated or pressurized water source 40 biases the make-up water 45 to flow along a liquid path 52 to the reservoir 25 of the container 10. The liquid path 52 preferably includes a conventional plastic tubing or hose 54 having an inside diameter of about a quarter of an inch (¼) inch. The make-up water 45 flows in a single direction 55 along the path 52 from the source of water 40 to the reservoir 25.

A pilot controlled sequence valve 60 is located along the liquid path 52. The sequence valve 60 has an outer housing 61 formed by first and second opposed, cup-shaped portions 62 and 72. The housing 61 and portions 62 and 72 are made of a rigid material such as a galvanized or non-corrosive metal or rigid plastic, and are robustly designed to maintain their shape during use. Each portion 62 and 72 has a face wall 63 or 73 and an integral outer wall 64 or 74 that is preferably round with a diameter of about two (2) inches. Each outer wall 64 and 74 forms a continuous rim 64a or 74a that uniformly engages the other to continuously and uniformly join the two portions 62 and 72 together. The portions 62 and 72 are bonded together with a conventional adhesive or solvent.

The first portion 62 defines a chamber 65 that is in fluid communication with a liquid inlet 66, a liquid outlet 67 and a vent 68. The inlet 66, outlet 67 and vent 68 have an inside diameter of about ⅛ inch. The inlet 66 is centrally located in the face wall 63, and has an outwardly extending nipple for connecting the tubing 54 from the water source 40. The outlet 67 and vent 68 extend through the outer wall 64, and are diametrically opposed. During use, the inlet 66 is located above the outlet 67 and below the vent 68. All three openings 66–68 are in fluid communication with each other and ambient chamber 65. Liquid make-up water 45 that enters the chamber 65 via the inlet 66, flows down to the outlet 67 under the force of its own weight as shown in FIG. 2B. Outside air is free to enter and leave the chamber 65 via the vent 68. Thus, the ambient chamber 65 remains at atmospheric pressure during operation. The second portion 72 defines a control chamber 75 that is in fluid communication with an access way 76 that passes through an outwardly extending nipple. The volume of the control chamber 75 is kept to a minimum for reasons discussed below.

The sequence valve 60 includes flexible member 80 for selectively opening and closing the valve responsive to pressure feedback information generated by the actual level of the water 30 between levels 32 and 34. The flexible valve member 80 is preferably a disc shaped elastic diaphragm positioned between the housing portions 62 and 72. The diaphragm 80 has a center 81, an outer edge 82, and a diameter of about two (2) inches, which is roughly equal the diameter of the housing 61. The diaphragm 80 has a uniform thickness of about 20 thousandths (0.020) of an inch. The center 81 of the diaphragm 80 is located proximal the centrally located inlet 66. The outer edge 82 is uniformly and continuously sandwiched between and held firmly in place by the rims 64a and 74a of the housing 61 when bonded together. The diaphragm 80 forms an airtight closure that separates control chamber 75 from ambient chamber 65. The diaphragm 80 also acts as a gasket and works in conjunction with the bonding adhesive that joins portions 62 and 72 together to form an airtight seal around chamber 75 relative to the outside air around the housing 61. The diaphragm 80 is made of a flexible material, such as rubber or rubber-like material, and is preferably ethylene propylene (EPDM).

The central area 84 of the diaphragm 80 is stiffened to resist localized deformation when water 45 exiting the inlet 66 strikes or contacts the front surface of the diaphragm 80. The diaphragm 80 preferably includes a centrally located stiffening disk 85 as in FIG. 3A. The disk 85 is made of a rigid plastic that does not flex during the operation of the valve 60. The rigid disk 85 is glued or otherwise firmly secured to the center 81 of the diaphragm 80 opposite the inlet 66. The stiffening disk 72 has a diameter of about one inch, and increases the effective area of the diaphragm 80 working against the fluid forces exerted by the fluid 45 exiting the inlet 66. When the water 45 strikes the diaphragm 80, the central area 84 moves away from the inlet 66 but does not flex. A larger diameter donut-shaped 86 area extending from the edge of the stiffening disk 85 flexes under the force of the water 45. In alternate embodiments, the valve 60 includes two diaphragms 80a and 8b that sandwich the stiffening disk 85 to hold it in place as in FIG. 3B, or the valve can include a molded diaphragm 80c that is specifically molded to the shape of the stiffening disk to hold it in place as in FIG. 3C.

When the chamber 75 is at atmospheric pressure, the diaphragm 80 and its disk 85 move away from the liquid inlet 66 to an open position 88 as in FIG. 2B. This allows liquid 45 to flow through a pathway or passage formed between the diaphragm 80 and inlet 66 and down through the chamber 65 to the outlet 67. When the chamber 75 is at a predetermined pressure of about one inch of water column above atmospheric pressure, the diaphragm 80 and its disk 85 move toward the liquid inlet 66 to a closed position 89 where the front surface of the diaphragm 80 seats against and seals off the liquid outlet 66 as in FIG. 2A.

Figure 4:
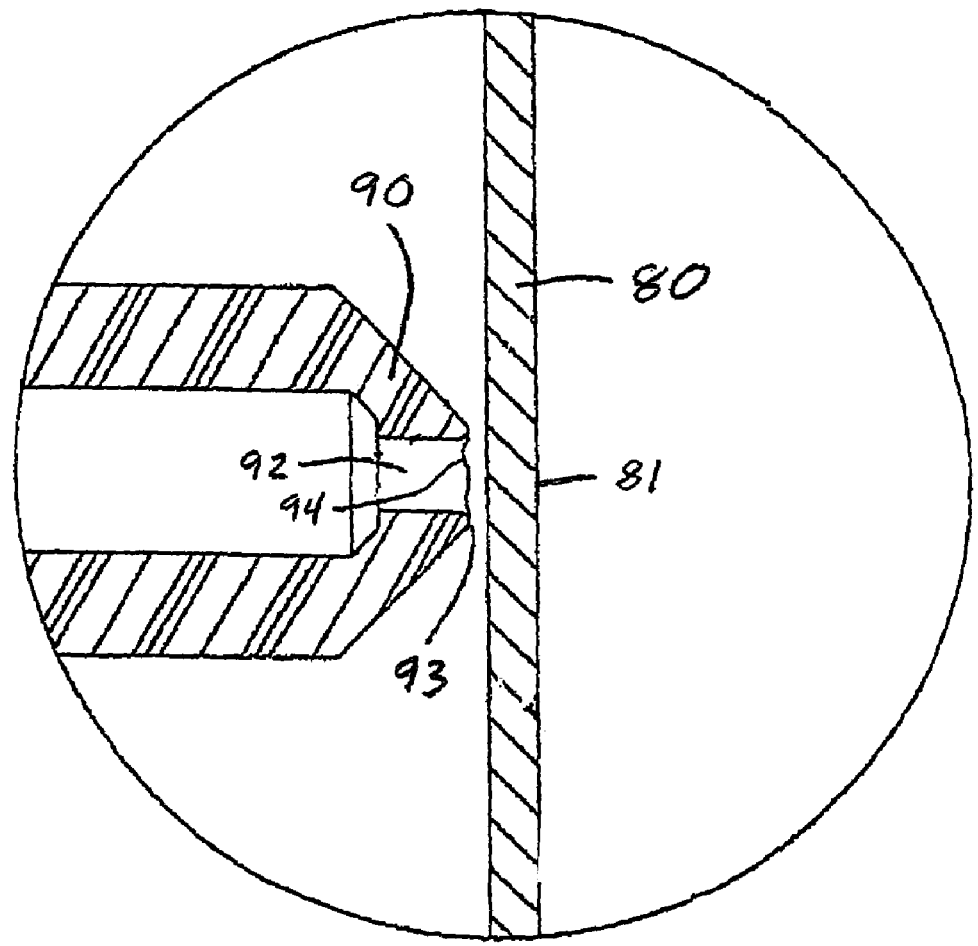
FIG. 4 is an enlarged cross sectional view of the sequence valve showing the notched nozzle embodiment of the invention.
Figure 5:
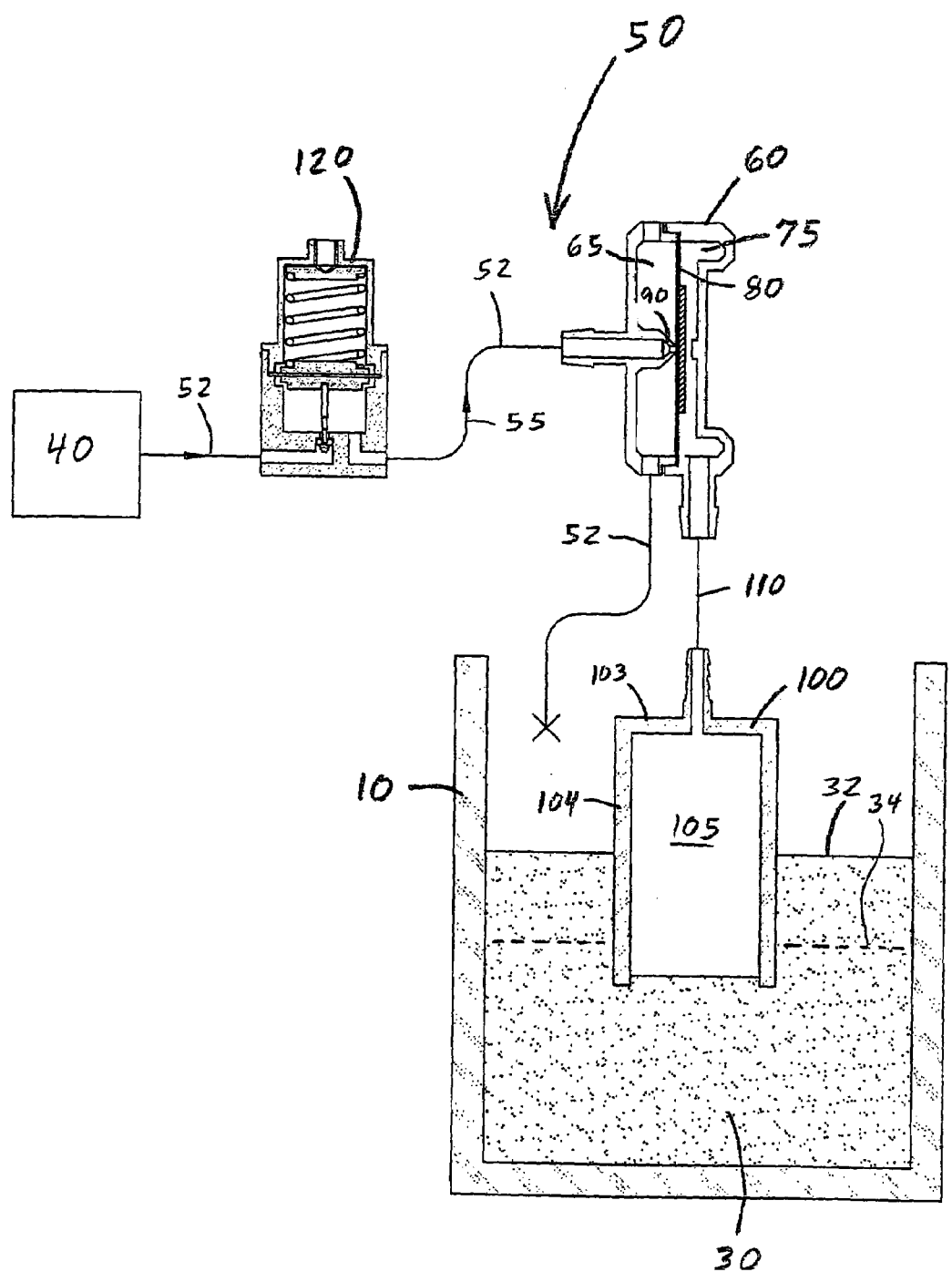
FIG. 5 is a diagrammatic view of the inventive liquid level maintaining device with its pilot controlled sequence valve, optional pressure regulator and pilot pressure sensor shown in cross-sectional view.
Figure 6:
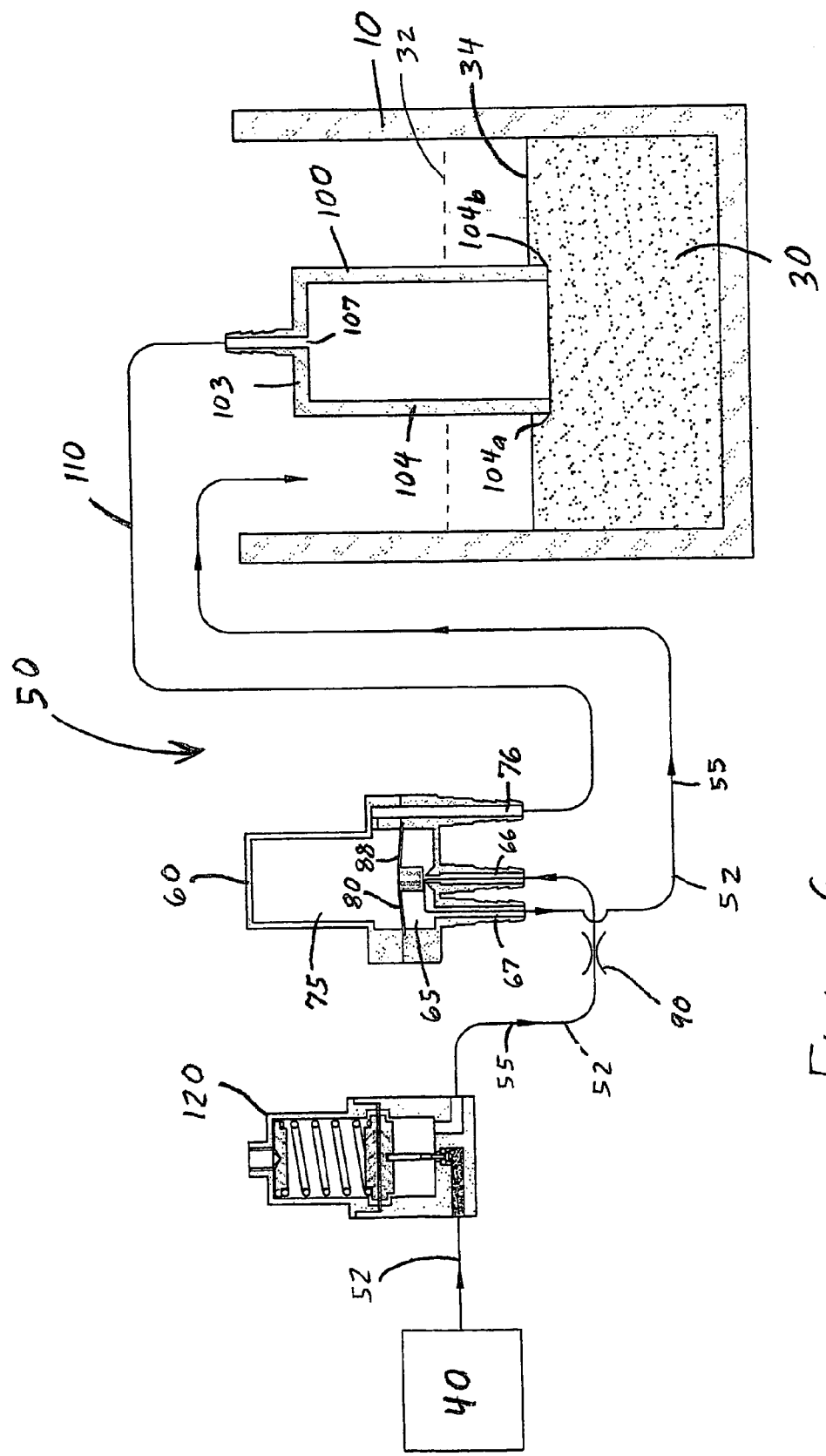
FIG. 6 is a diagrammatic view of an alternate embodiment of the inventive liquid level maintaining device with a no-nozzle, non-vented embodiment of the pilot controlled sequence valve and optional pressure regulator shown in cross-sectional view, and with a flow restricting orifice between the valve and regulator.

The liquid level maintaining device 50 includes a flow control or restricting mechanism 90 such as a nozzle to limit the volumetric rate of flow of water 45 through the device as in FIGS. 1–5, but can also take the form of an orifice as in FIG. 6. The makeup water 45 flows through the nozzle 90 to reach the reservoir 25. The nozzle 90 is preferably an integral part of the inlet 66 of the sequence valve 60. The nozzle 90 is located upstream of the diaphragm 80 and preferably at or proximal the innermost end of the inlet 66, so that the diaphragm seals its discharge opening 92 by seating against the innermost end 93 of the nozzle 90 and inlet 66. The discharge opening 92 has a diameter of about 40 to 50 thousandths (0.040 to 0.050) of an inch, and restricts the flow rate of the device 50 to about three (3) to four (4) gallons per hour. The size of the lower outlet 67 is sufficiently large so that when the valve is fully open 88 as in FIG. 2B, the level of the water 45 in chamber 65 should not reach the upper vent 67. When the valve 60 is closed 89 as in FIG. 2A, any water in chamber 65 will flowably drain through outlet 67, and the chamber will fill with outside air at ambient pressure via vent 67. Because the discharge opening 92 seats directly against the front surface of the diaphragm 80 when the valve is in its closed position 89, only a very small amount of water 45 pressure is applied to the diaphragm 80 when in the closed position. Thus, the valve 60 and diaphragm 80 will not move to the open position 88 until the pressure in chamber 75 is roughly equal to that of chamber 65.

The sequence valve 60 is positioned above the reservoir 25 as in FIGS. 1 and 5. The outlet port 67 of the valve 60 is positioned by and secured to a feed tube 95 that guides the flow of make-up water 45 from the outlet port 67 down to the reservoir 25 of the plant container 10. The feed tube 95 is formed by a rigid cylindrical wall 96 with open upper and lower ends 97 and 98. The inside diameter of the tube 95 is about one and one-half (1½) inches. The feed tube 95 passes through the compartment 15 and floor 13 of the plant container 10 so that its lower end 98 is spaced a desired or set distance from the floor 23 of the reservoir 25 by the raised ledge 28. The tube 95 is held in place by snug engagement with the floor 13 of the container 10, by the force of the soil 9 pressing against the outer surface of its cylindrical wall 96, or by a strap (not shown) fastened around the upper end of the tube 95 and secured to the container 10. The valve 60 is firmly secured to the open upper end 97 of the tube 95. The bottom side of the valve 60 has a radially extending flange 78 that forms a cap for covering the open top end 97. This cap or radial flange prevents objects from inadvertently entering the tube 95 and dropping down into the reservoir 25. The cap has a downwardly extending tubular flange or fingers 79 with an outer diameter sized to snuggly engage the inside surface of the wall 96 of the feed tube 95. The lower end 98 feed tube 95 extends below the desired level 32 of the body of water 30 in the reservoir 25.

The device 50 includes a pilot 100 positioned in the reservoir 25 so that it is at least partially below the desired water level 32. The pilot 100 has an inverted cup-shape with an upper wall or top 103 and an integral cylindrical outer wall 104 and lower rim 104a that define an inner chamber 105. The upper wall 103 closes the upper end of the chamber 105 except for a centrally located access way 107 through an outwardly extending nipple that is in fluid communication with the chamber 105. The pilot 100 is mounted inside the feed tube 95 proximal its lower end 98. The rim 104a of the pilot 100 defines an open end of the chamber 105 that is generally even with the lower end 98 of the feed tube 95. The diameter of the pilot 100 in the vicinity of the rim 104a approaches and is about equal to the diameter of the feed tube 95. The outer wall 104 has an outwardly extending flexible flange (not shown) that snuggly and slidingly engages the inside surface of the feed tube 95, but is open to allow makeup water 45 to enter the reservoir 25. Although the pilot 100 is shown secured to the feed tube, it should be understood that the pilot could be secured to a portion of the container 10 so as to maintain the pilot in a fixed position relative to the reservoir 25 so that the rim 104a is below the desired or set water level 32.

The chamber 105 of the pilot 100 is in fluidic communication with the chamber 75 of the sequence valve 60 via an elongated pilot tube 110. The tube 110 is about one foot long and has an inside diameter of about one-quarter (¼) inch. The pilot tube 110 is made of plastic or another suitable air impermeable and relatively inelastic material such as a plastic tube. One open end of the tube 110 is firmly secured to the nipple of the access way 107 of the pilot 100 to form an air tight seal. The other open end of the tube 110 is firmly secured to the nipple of the access way 78 of the sequence valve 60 to form an air tight seal. Although the pilot tube 110 is shown as a rigid pipe supporting the weight of the pilot 100, the tube 110 need only be rigid or stiff enough to hold or maintain the vertical and angular position of the pilot 100 and its rim 104a when submerged in the water 30, the buoyancy of which tends to push the pilot upward.

The pilot 100 and pilot tube 110 form a pressure transmitting passageway for transmitting a pressure signal or pressure information to the control chamber 75. The open end or rim 104a of the chamber 105 is positioned face down in the body of water 30 at a desired level 104b that is about one inch below the desired surface level 32 of the water 30. The air in the chamber 105, as well as in the tube 110 and chamber 75, is trapped in an enclosed or confined volumetric space that is filled with air during operation. In order to minimize the effect of daily and seasonal temperature changes, such as day and night or summer and winter, the diameter of chamber 105 at the air/water boundary level 36 is maximized while the total volume of the confined volumetric space is minimized. The air in the pilot 100 is in pressurized communication with the surface of the water along the rim 104a or extending into the chamber 105. Given the relatively light weight of air and other such gases, chamber 75 is essentially at about the same air pressure as chamber 105, notwithstanding the fact that chamber 75 is positioned about a foot or more above chamber 105. The water/air pressure boundary or level 36 seen proximal the open end or rim 104a of the pilot 100 is substantially the same as the air pressure in the chamber 75. As the water level 32 in the tank 25 rises, the water/air pressure boundary seen proximal the open end 104 of the pilot 100 and the air pressure in the chamber 75 rise. Similarly, as the water level 32 in the tank 25 drops, the water/air pressure boundary seen proximal the open end 104a of the pilot 100 and the air pressure in the chamber 75 drop. A wire mesh screen (not shown) or pressure transmitting flexible membrane can be positioned over the rim 104a of the chamber 105 to keep the roots 7 of the plant 5 from entering and potentially clogging the chamber or its access opening 107.

When necessary, the device 50 includes a conventional pressure regulator 120 as in FIGS. 5 and 6 to reduce the pressure of the make-up water 45 before or upstream of the sequence valve 60. The pressure regulator is preferably a conventional non-bleed, non-relieving pressure regulator, such as Model No. ORS-811-15-HF made by Airtrol Components, Inc. of New Berlin, Wis. Such a pressure regulator can be included when the device 50 is used with a source of water 40 such as a standard pressurized water system of a house or building. In the embodiment of the device shown in FIG. 6, chamber 65 does not include a vent 68. The chamber 65 of the non-vented valve 60 can be pressurized by the makeup liquid 45 and does not need to be positioned above the reservoir 25.

Operation of Water Level Maintaining Device

Although not always necessary, the first step in the method used by the liquid level maintaining device 50 is to reduce the supply pressure of the liquid source 40 to a desired pressure range of about 1 to 30 psi, and preferably between 5 to 15 psi, via the pressure regulator. When the water source 40 is a tank that allows the make-up water 45 to flow in a "gravity fed" manner along the liquid path 52, the pressure regulator 120 will not be necessary provided the tank is between 2 and 70 feet, and preferably between about 10 to 35 feet, above the sequence valve 60. By keeping the liquid pressure just prior to the nozzle 90 at about 5 to 15 psi, the nozzle 90 will restrict the volumetric flow rate of water 45 through the device 50 to less than or equal to about three to four gallons per hour, which should not create excessive fluid forces on the diaphragm 80 and prevent its closing 89 when the actual water level in the reservoir 25 reaches the desired water level 32. The make-up liquid 45 is then received by the pilot controlled sequence valve 60. The valve 60 allows the liquid 45 to flow into the reservoir 25 as in FIG. 2B until the actual water level reaches a desired level 32, at which time chamber 105 of the pilot port 100 senses the increase in pressure and transmits that pressure to the chamber 75 of the sequence valve. This increased pressure in chamber 75 creates enough force on the diaphragm 80 to move the diaphragm 80 to its closed position 89 and stop the flow of liquid 45 through the sequence valve 60 as in FIG. 2A. After some time, the actual level of the water 30 in the reservoir 25 drops below the desired level 32 to a lower level 34, due to consumption by the plant or evaporation or whatever means. This reduces the pressure in chamber 105 of the pilot port 100, which reduces the pressure in chamber 75 acting on the diaphragm 80 to keep it in its closed position 89. As a result, the diaphragm 80 moves to its open position 88 as in FIG. 2B, which allows the liquid 45 to once again flow through the sequence valve 60 and into the container 25. This cycle is repeated as long as there is a sufficiently pressurized source 40 of make-up water 45. In this way, the actual water level in the reservoir 25 remains within about a half (½) inch of the desired water level 32.

Bernoulli's Effect

Instability can occur for high flow rates that are well above 3 to 4 gallons per hour as for the system described above. This instability occurs when the elastic diaphragm 80 begins to seal off the flow of liquid 45 coming from the internal nozzle 90. This instability is a function of the speed and density of the liquid or fluid through the nozzle 90. This flow from the nozzle 90 is controlled by the position of closure member 80. As the closure member 80 moves into close proximity to the nozzle 90, a vibration of the closure member 80 is often created. The vibration is related to and dependent upon the particular spacing of the closure member 80 with respect to the nozzle 90 as well as the material of the closure member. Thus, at a particular balance position, the liquid 45 moving through the relatively small gap between the closure member 80 and nozzle 90 tends to create suction with a corresponding reduction in pressure to the downstream side of the nozzle 90. This is the Bernoulli's Effect discussed above. The result is a pressure buildup on the upstream side of the nozzle 90, and the closure member 80 tends to move away from the nozzle to balance and offset such characteristic. This in turn reverses the pressure conditions, and the closure member 80 then tends to move toward the nozzle 90. This is an unstable state, resulting in vibration of the closure member 80, which causes an undesirable pulsating flow. The member 80 vibrates at a fundamental vibrating frequency related to the dynamics of the liquid 45 movement and the physical characteristics of the elements. This latter movement not only creates an unstable pressure signal condition, but also may well result in a very distinct audible noise. Methods have been suggested for minimizing the vibrational effect. A conventional method is the weighting of the closure member 80 to dampen vibrations. This however reduces the sensitivity of the closure member 80 to the closing force. There is therefore a need for a generally universal means and structure to eliminate such vibrational characteristic and noise in a liquid signal valve, which must of course be adapted to practical commercial implementation.

Nozzle Structure

The present invention is particularly directed to a liquid signal valve having a means incorporated into the opposing sealing surfaces of the nozzle 90 and the closure member 80 which produces a controlled leakage therebetween in such a construction and arrangement so as to eliminate vibrational conditions in a leakport-type nozzle structure, as shown in FIG. 4. Generally in accordance with the present invention, the controlled leakage disrupts the flow characteristic to minimize or compensate for the suction conditions, thereby essentially eliminating conditions generating vibrational response of the closure member 80. In accordance with the teaching of the present invention, the closure member 80 and opposed outermost end 93 of the nozzle 90 are specially constructed such that a leakage path is maintained as the closure member moves into a sealing engagement 89 with the outer nozzle edge 93 and with the leakage path forming a progressively increasing proportion of the total flow. Such controlled leakage can be provided in various ways. A particularly satisfactory and unique embodiment includes a sharp ended 93 planar nozzle 90 having a plurality of circumferentially distributed minor edge notches 94 and located in opposed parallel relation to a generally flat closure member 80. By appropriate sizing of the notches 94, the vibration and noise of the conventional nozzle structure is eliminated regardless of the flow direction. Thus, the device operates with a positive or negative pressure applied to the nozzle 90. Generally, a minimal flow is created under all conditions. However, by selection of a material of a suitable durometer, a total seal can be created by deformation of the closure member 80 to fill such notches 94.

The result is a stable output pressure, which is free of audible noise or the like. The signal orifice can of course be used in any pneumatic or other liquid control or operating system whether a vacuum or positive pressure system. This aspect of the invention is particularly directed to practical mass production of a molded nozzle 90 structure in which the individual port 92 can be readily molded with the necessary notched 94 construction. Injection molding plastic processes are such that a high degree of repeatability can be obtained. As a result, a series of nozzles 90 having the same accuracy and repeatability of the signal characteristic can be provided.

Other structural means of forming the controlled leakage, within the broadest implementation of the teaching of the present invention, may be provided such as the use of a particular resilient rubber-like material which deflects in response to the emitting liquid flow to create the special leakage characteristics. The leakage spacing can be created by appropriate nozzle projections (not shown) tending to prevent the normal movement of the sealing media in a constant planar position with respect to the nozzle 90. In fact, the sealing or closure member 80 may be formed as a grooved member or even as a series of telescoping, sealing elements mounted for successive movement toward the nozzle 90.

The present invention thus provides a relatively simple, stable, leak proof valve 60 structure, which is adapted to commercial production with well known manufacturing techniques and which produces a stable output signal and particularly a signal which has a minimal or no vibrational characteristics. When this pilot controlled sequence valve 60 is used in conjunction with the aforementioned nozzle 90 and pressure regulator 120, the unit 50 functions with high accuracy and repeatability while maintaining a liquid level to a very close tolerance.

While the invention has been described with reference to a preferred embodiment, it will be understood by those skilled in the art that various changes may be made and equivalents may be substituted without departing from the broad aspects of the invention.

We claim:

1. A liquid level maintaining device for monitoring the surface level of a body of liquid held by a reservoir and controllably supplying make-up liquid from a liquid source to maintain the surface level of the body of liquid at a set level in the reservoir, said liquid level maintaining device comprising:
    a flow path between the liquid source and the reservoir, the make-up liquid being biased to flow from said liquid source along said flow path to the reservoir;
    flow restricting means for restricting the make-up liquid to a desired volumetric flow rate as the make-up liquid flows along said flow path;
    a pilot with a pressure sensing port and a pressure transmitting passageway filled with a gas, said pilot being secured to maintain said port at a fixed level relative to the reservoir, said fixed level being below the surface level of the body of liquid, and said gas being in pressurized communication with a surface of the liquid;
    a pilot controlled sequence valve having a liquid inlet, a liquid outlet, a control chamber and a pressure activated valve mechanism movable between open and closed positions, said control chamber being in pressure transmitting communication with said gas in said pressure transmitting passageway, and said valve mechanism moving to its said open position to open a pathway between said inlet and outlet when said control chamber is below a predetermined pressure, and moving to its said closed position to close said pathway when said control chamber is at least equal to said predetermined pressure; and,
    wherein the sequence valve moves to said open position and the make-up liquid flows from the liquid source to the reservoir when the surface level of the body of liquid drops to a lower level, and said sequence valve moves back to its said closed position when the surface level of the body of liquid rises to the set level.

2. The liquid level maintaining device of claim 1, and wherein said valve mechanism is an elastic diaphragm that sealingly separates said control chamber from an ambient chamber, said ambient chamber being in fluid communication with external air via an air vent, in fluid communication with said liquid outlet, and in fluid communication with said liquid inlet when said diaphragm is in an open position.

3. The liquid level maintaining device of claim 2, and wherein said liquid outlet is located at a lower end of said ambient chamber, said air vent is located at an upper end of said ambient chamber, and said liquid inlet is located proximal a center of said ambient chamber, said ambient chamber being in continuous fluid communication with said air vent and said liquid outlet.

4. The liquid level maintaining device of claim 2, and wherein said elastic diaphragm includes a central stiffening disk, and said elastic diaphragm flexes under pressure in a donut-shaped area around said stiffening disk.

5. The liquid level maintaining device of claim 2, and wherein said flow restrictor is a nozzle located along said inlet of said sequence valve that discharges the make-up liquid into said diaphragm.

6. The liquid level maintaining device of claim 5, and wherein said nozzle has a discharge opening and said diaphragm engages and closes said discharge opening when said diaphragm is in a closed position, and said diaphragm moves away from and opens said discharge opening when said diaphragm is in an open position.

7. The liquid level maintaining device of claim 2, and wherein the liquid source is located above the reservoir and the make-up liquid is biased by gravity to flow along said flow path toward the reservoir.

8. The liquid level maintaining device of claim 2, and wherein the liquid source is a pressurized system having at least a given pressure, and the make-up liquid is biased by said pressurized system to flow along said flow path toward the reservoir.

9. The liquid level maintaining device of claim 8, and further comprising a pressure regulator located along said flow path between said the liquid source and said pilot controlled sequence valve.

10. The liquid level maintaining device of claim 1, and wherein the body of liquid and make-up liquid are water, and said gas in said passageway of said pilot and said control chamber of said sequence valve is air.

11. The liquid level maintaining device of claim 10, and wherein said liquid level maintaining apparatus is adapted to operate in an ambient air environment where the air external to said liquid level maintaining device is at atmospheric pressure, and said air in said pilot has a pressure about equal to said atmospheric pressure when said surface level of the body of liquid is at said lower level.

12. The liquid level maintaining device of claim 1, and wherein the reservoir is formed by a plant container, said plant container having an upper portion with a floor and an outer wall for holding a plant and soil for the plant, said plant container including a lower portion that forms the reservoir, said floor of said upper portion having openings to allow the root system of the plant to extend into the reservoir.

13. The liquid level maintaining device of claim 12, and wherein said plant container and the reservoir are an integrally molded part.

14. The liquid level maintaining device of claim 12, and wherein said sequence valve and said pilot are secured to one of either the reservoir and said plant container, said lower end of said pilot being held at a fixed position below the surface level of the body of liquid.

15. The liquid level maintaining device of claim 12, and wherein said flow path downstream of said sequence valve includes a feed tube, and said feed tube is secured to and held in a fixed position by said plant container, said sequence valve is secured to and held in a fixed position by said feed tube, and said pilot is secured to and held in a fixed position by said sequence valve via a pilot tube.

16. The liquid level maintaining device of claim 15, and wherein said pilot has an outer wall with a rim that defines an open lower end, said pilot having a given diameter proximal said rim, and said feed tube has an outer wall with an inside diameter, and said given diameter of said pilot proximal said rim is substantially equal to said inside diameter of said feed tube.

17. The liquid level maintaining device of claim 1, and wherein said pressure transmitting passageway of said pilot has a barrier to prevent the root system of the plant from entering said pressure transmitting passageway while allowing the water pressure of the reservoir to be communicated with said gas in said pilot.

18. The liquid level maintaining device of claim 1, and wherein said flow path includes tubing with a predetermined diameter, and said flow restricting means is formed by said tubing.

19. The liquid level maintaining device of claim 6, and wherein the make-up liquid is flowing at a high flow rate, and said discharge opening of said nozzle has at least one notch that forms a leak pathway for said make-up liquid when said diaphragm approaches its said closed position, and said elastic diaphragm deforms over said notch when in said substantially closed position to close said leak pathway.

* * * * *